(12) United States Patent  
Suzuki

(10) Patent No.: US 12,305,051 B2  
(45) Date of Patent: May 20, 2025

(54) IMAGE FORMING METHOD

(71) Applicant: Konica Minolta, Inc., Tokyo (JP)

(72) Inventor: Keishi Suzuki, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 198 days.

(21) Appl. No.: 18/057,897

(22) Filed: Nov. 22, 2022

(65) Prior Publication Data

US 2023/0183506 A1 Jun. 15, 2023

(30) Foreign Application Priority Data

Dec. 15, 2021 (JP) .................. 2021-203293

(51) Int. Cl.
*C09D 11/38* (2014.01)
*B41M 5/00* (2006.01)
*C09D 11/326* (2014.01)

(52) U.S. Cl.
CPC ........... *C09D 11/38* (2013.01); *B41M 5/0047* (2013.01); *C09D 11/326* (2013.01)

(58) Field of Classification Search
CPC ..... C09D 11/38; C09D 11/326; C09D 11/102; C09D 11/107; C09D 11/322; C09D 11/40; C09D 11/54; B41M 5/0047; B41M 5/0064; B41M 5/0017; D06P 1/44; D06P 1/5242; D06P 1/525; D06P 1/5278; D06P 1/5285; D06P 1/6533; D06P 1/67341; D06P 1/67383; D06P 5/002; D06P 5/08; D06P 5/30
USPC ........................................................ 347/100
See application file for complete search history.

(56) References Cited

U.S. PATENT DOCUMENTS

| | | | | |
|---|---|---|---|---|
| 2002/0081421 A1* | 6/2002 | Bagwell | .................... | D06P 5/30 428/32.1 |
| 2005/0225618 A1* | 10/2005 | Askeland | ............. | B41M 7/0027 347/100 |
| 2011/0069109 A1* | 3/2011 | Tojo | ..................... | B41M 5/0023 347/21 |

(Continued)

FOREIGN PATENT DOCUMENTS

| | | |
|---|---|---|
| CN | 107614275 A | 1/2018 |
| JP | 2010-150453 A | 7/2010 |

(Continued)

OTHER PUBLICATIONS

European Patent Application No. 22203767.3; Extended Search Report; dated Apr. 3, 2023; 15 pages.

*Primary Examiner* — Jason S Uhlenhake
*Assistant Examiner* — Alexander D Shenderov
(74) *Attorney, Agent, or Firm* — BakerHostetler

(57) ABSTRACT

An image forming method includes: preparing a fabric to which an aggregating agent is attached; applying an aqueous ink containing a pigment, a first resin, and water onto the fabric to which the aggregating agent is attached; and applying a coating liquid containing a second resin and water onto the applied aqueous ink, wherein the second resin is aggregated by the aggregating agent, a content of the second resin in the coating liquid is smaller than a content of the first resin in the aqueous ink, and an amount of the coating liquid attached to the fabric is larger than an amount of the aqueous ink attached to the fabric.

13 Claims, 1 Drawing Sheet

(56) References Cited

U.S. PATENT DOCUMENTS

| | | | |
|---|---|---|---|
| 2013/0222497 A1* | 8/2013 | Nakano | C09D 11/322 347/100 |
| 2014/0186533 A1* | 7/2014 | Kitagawa | D06P 1/66 427/288 |
| 2018/0030301 A1* | 2/2018 | Yamazaki | D06P 1/673 |
| 2019/0352528 A1 | 11/2019 | Yamazaki et al. | |

FOREIGN PATENT DOCUMENTS

| | | |
|---|---|---|
| JP | 2013-071957 | 4/2013 |
| JP | 2014-104621 | 6/2014 |
| JP | 2019-099790 | 6/2019 |

* cited by examiner

IMAGE FORMING METHOD

This application claims priority to Japanese Patent Application No. 2021-203293, filed on Dec. 15, 2021, the entire disclosure of which is incorporated herein by reference.

BACKGROUND

Technological Field

The present invention relates to an image forming method.

Description of the Related art

So-called inkjet textile printing, in which an image is formed on a fabric by an inkjet method, is a technique that facilitates simplification of steps and handling of small lots as compared with screen textile printing or the like, and can provide a textile printed product at low cost.

As an ink for inkjet textile printing, a dye ink is mainly used. In the dye ink, since a dye is attached to fibers of a fabric, an image with high fixability is easily obtained, but heating for attaching the dye and a treatment for washing away the dye that has not been attached to the fibers are required. Therefore, use of a pigment ink that can omit these treatments has been studied.

The pigment ink usually contains a pigment, resin particles (binder resin), and water. In an image formed with such a pigment ink, since pigment particles are likely to be exposed in the vicinity of a surface of a fabric, high color developability is exhibited, but friction fastness tends to be low. In particular, in textile printing applications, such friction fastness that color loss and color transfer due to sliding can be suppressed is required.

On the other hand, studies have been made to improve friction fastness by covering a surface of a pigment ink layer applied to a fabric with a transparent coating liquid. For example, JP 2013-71957 A discloses a textile printing method in which a pigment ink containing a pigment and a first resin is attached to a fabric, and then a coating liquid containing a second resin and water is attached onto the attached pigment ink. JP 2013-71957 A discloses that ejection stability by inkjet is enhanced by decreasing the content of the first resin in the ink, and fixability can be secured by increasing the content of a second resin in the coating liquid to be larger than the content of the first resin in the ink.

JP 2014-104621 A discloses an inkjet recording method in which a coloring ink is applied to a recording medium and then a transparent treatment ink is applied thereto. JP 2014-104621 A discloses that ejection stability by inkjet is enhanced by making the viscosity of the transparent treatment ink lower than the viscosity of the coloring ink, and a covering property can be ensured by making the number of liquid strokes of the transparent treatment ink larger than the number of liquid strokes of the coloring ink.

JP 2019-99790 A discloses an inkjet textile printing method in which an ink composition containing a pigment and resin particles is attached to a fabric, and then a coating composition containing resin particles and water is attached onto the attached ink composition. In addition, JP 2019-99790 A discloses that the content of the resin particles in the coating composition is smaller than the content of the resin particles in the ink composition, and that the application amount of the coating composition is larger than the application amount of the ink composition.

In textile printing using such a pigment ink, it is desirable to thicken the ink or the coating liquid in the vicinity of a surface of a fabric such that the components contained in the ink or the coating liquid do not permeate the fabric from a viewpoint of enhancing color developability and making a texture of the fabric less likely to be impaired. For this reason, in order to aggregate and thicken the pigment contained in the ink and the resin particles contained in the coating liquid on the fabric, a treatment (pretreatment) of attaching an aggregating agent to the fabric in advance may be performed.

However, when the ink is applied onto the fabric to which such an aggregating agent is attached and then the coating liquid is applied thereto, the resin particles contained in the coating liquid are likely to be excessively aggregated, and the coating liquid may be less likely to be wet-spread. As a result, a surface of the ink layer cannot be sufficiently covered with the coating liquid, and sufficient friction fastness cannot be obtained in some cases. When the content of the resin particles in the coating liquid is increased in order to obtain sufficient friction fastness, the fabric may be hard and a texture thereof may be impaired.

SUMMARY

The present invention has been made in view of the above problems, and an object of the present invention is to provide an image forming method capable of forming an image having favorable friction fastness without impairing a texture of a fabric.

To achieve the abovementioned object, according to an aspect of the present invention, an image forming method reflecting one aspect of the present invention comprises: preparing a fabric to which an aggregating agent is attached; applying an aqueous ink containing a pigment, a first resin, and water onto the fabric to which the aggregating agent is attached; and applying a coating liquid containing a second resin and water onto the applied aqueous ink, wherein the second resin is aggregated by the aggregating agent, a content of the second resin in the coating liquid is smaller than a content of the first resin in the aqueous ink, and an amount of the coating liquid attached to the fabric is larger than an amount of the aqueous ink attached to the fabric.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1A:
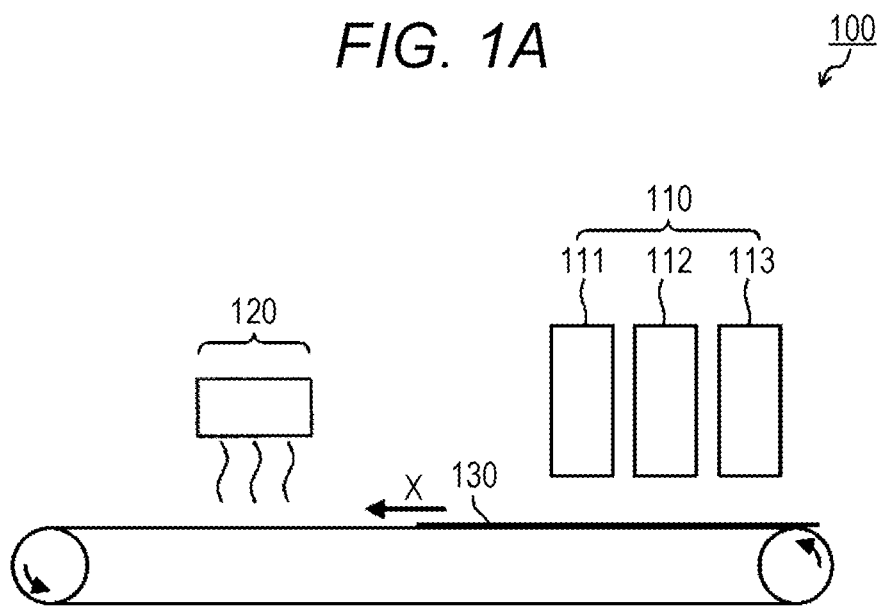
FIGS. 1A and 1B are schematic diagrams illustrating a configuration of an image forming apparatus used for an image forming method according to an embodiment of the present invention.

Hereinafter, one or more embodiments of the present invention will be described with reference to the drawings. However, the scope of the invention is not limited to the disclosed embodiments.

The present inventors have found that the above problem can be solved by making the amount of a resin (second resin) contained in a coating liquid smaller than the amount of a resin (first resin) contained in an ink and making the amount of the coating liquid attached to a fabric larger than the amount of the ink attached to the fabric.

That is, by reducing the amount of the second resin contained in the coating liquid, a reaction rate between an aggregating agent present on the fabric or on an ink layer and the second resin can be reduced. As a result, the coating liquid applied onto the ink layer is less likely to be excessively thickened, and thus is easily wet-spread. In addition, by applying a large amount of the coating liquid having a small content of the second resin (increasing an attachment amount), a surface of the ink layer can be sufficiently covered with the coating liquid, and therefore the surface of the ink layer can be thinly and uniformly covered with the second resin. As a result, friction fastness can be sufficiently enhanced without impairing the texture of the fabric. Note that the amounts of the first resin and the second resin contained in these liquids and the attachment amounts of these liquids all mean amounts on a mass basis.

On the other hand, when the amount of the second resin contained in the coating liquid is reduced, the reaction rate between the second resin and the aggregating agent may decrease, and the coating liquid may permeate the fabric. When the coating liquid permeates the fabric, the second resin easily binds fibers inside the fabric to each other. Therefore, the fabric tends to be hard and a texture thereof tends to be impaired. In this regard, by setting the amount of the ink-derived first resin attached to the fabric to a certain level or more, or by setting the type (particularly Tg) of the first resin to a specific type, permeation of the coating liquid into the fabric can be suppressed. Hereinafter, an image forming method according to an embodiment of the present invention will be described in detail.

1. Image forming method. An image forming method according to an embodiment of the present invention includes: 1) a step of preparing a fabric to which an aggregating agent is attached; 2) a step of applying an aqueous ink (hereinafter, simply referred to as "ink") containing a pigment, a first resin, and water onto the fabric to which the aggregating agent is attached; and 3) a step of applying a coating liquid containing a second resin and water onto the applied ink.

1) Step of preparing fabric to which aggregating agent is attached. The fabric to which the aggregating agent is attached can be obtained by any method. For example, the fabric to which the aggregating agent is attached can be obtained by applying a pretreatment liquid containing the aggregating agent to the fabric.

<Fabric>

The type of fiber contained in the fabric is not particularly limited, and may be a natural fiber or a chemical fiber. Examples of the natural fiber include cotton, hemp, wool, and silk. Examples of the chemical fiber include synthetic cellulose, rayon, vinylon, nylon, acrylic, polyurethane, polyester, and acetate. Among these fibers, the fabric preferably contains a natural fiber or a synthetic cellulose fiber, and more preferably contains cotton or a synthetic cellulose fiber.

The fabric may contain two or more types of fibers. For example, the fabric may contain a natural fiber or a synthetic cellulose fiber and another fiber (for example, a polyester fiber). In this case, a ratio of the natural fiber or the synthetic cellulose fiber may be preferably 35% by mass or more, and more preferably 50% by mass or more with respect to fibers constituting the fabric.

The fabric may be obtained by forming these fibers into any form such as a woven fabric, a nonwoven fabric, or a knitted fabric.

<Pretreatment>

A pretreatment liquid is applied to a surface of at least a part of the fabric. The pretreatment liquid may be applied to the entire surface of the fabric or selectively applied only to a region to be dyed.

The pretreatment liquid contains an aggregating agent. The aggregating agent aggregates the pigment in the ink to facilitate thickening the ink on the fabric, and aggregates or precipitates the second resin in the coating liquid to thicken the coating liquid on the ink layer. As a result, the ink or the coating liquid is less likely to permeate the fabric, and can be held in the vicinity of a surface of the fabric. A mechanism of aggregating or precipitating the pigment or the second resin is not particularly limited, and may be an electrical action (reaction between an anionic group and a cationic group) or an action due to a change in pH.

The aggregating agent contains one or more selected from the group consisting of a polyvalent metal salt, an organic acid, and a cationic polymer.

The polyvalent metal compound is not particularly limited, but examples thereof include a titanium compound, a chromium compound, a copper compound, a cobalt compound, a strontium compound, a barium compound, an iron compound, an aluminum compound, a calcium compound, and a magnesium compound. Preferable examples thereof include an aluminum compound, a calcium compound, a magnesium compound, and salts thereof.

Specific examples of the polyvalent metal compound include calcium carbonate such as heavy calcium carbonate or light calcium carbonate, chalk, kaolin, calcined clay, talc, calcium nitrate, calcium sulfate, barium sulfate, titanium dioxide, zinc oxide, zinc sulfide, zinc carbonate, aluminum silicate, calcium silicate, magnesium silicate, synthetic silica, aluminum hydroxide, alumina, sericite, white carbon, saponite, calcium montmorillonite, sodium montmorillonite, and bentonite. For example, calcium nitrate or calcium chloride is preferable, and calcium nitrate is more preferable from a viewpoint of favorable solubility in water.

Examples of the cationic polymer include a cationic urethane-based resin, a cationic olefin-based resin, an allylamine-based resin, and polyethyleneimine. These polymers can each have, as a cationic functional group, a primary, secondary, or tertiary amino group, a pyridine group, an imidazole group, a benzimidazole group, a triazole group, a benzotriazole group, a pyrazole group, a benzopyrazole group, or the like.

The cationic urethane-based resin may be a commercially available product, and examples thereof include Hydran CP-7010, CP-7020, CP-7030, CP-7040, CP-7050, CP-7060, and CP-7610 (trade names, manufactured by DIC Corporation); SuperFlex 600, 610, 620, 630, 640, and 650 (trade names, manufactured by DKS Co., Ltd.); and urethane emulsions WBR-2120C and WBR-2122C (trade names, manufactured by Taisei Fine Chemical Co., Ltd.).

The cationic olefin-based resin has an olefin such as ethylene or propylene in a structural skeleton thereof, and a known one can be used. As the cationic olefin-based resin, a commercially available product can be used, and examples thereof include an Arrowbase CB-1200 and CD-1200 (trade names, manufactured by Unitika Corporation).

Examples of the allylamine-based resin include polyallylamine hydrochloride, polyallylamine amide sulfate, an allylamine hydrochloride/diallylamine hydrochloride copolymer, an allylamine acetate/diallylamine acetate copolymer, an allylamine acetate/diallylamine acetate copolymer, an allylamine hydrochloride/dimethylallylamine hydrochloride copolymer, an allylamine/dimethylallylamine copolymer, polydiallylamine hydrochloride, and polymethyldiallylamine acetate. Examples of a commercially available product of the allylamine-based resin include PAA-HCL-01, PAA-HCL-03, and PAA-HCL-05 (trade names, manufactured by Nittobo Medical Co., Ltd.).

Examples of a commercially available product of polyethyleneimine include EPOMIN (registered trademark) P-1000 manufactured by Nippon Shokubai Co., Ltd.

The organic acid may be a carboxylic acid having 1 to 6 carbon atoms. Examples of the organic acid include acetic acid, propionic acid, pantothenic acid, ascorbic acid, citric acid, malic acid, lactic acid, tartaric acid, succinic acid, and gluconic acid.

To the pretreatment liquid, water, a water-soluble organic solvent, a surfactant, a pH adjuster, an antiseptic, a chelating agent, a resin, and the like can be added according to a pretreatment method.

A method for applying the pretreatment liquid is not particularly limited, and may be any of a spray method, a mangle method (pad method), a coating method, and an inkjet method. For example, in a case where a pretreatment liquid applying step and an ink applying step are performed online, an inkjet method is preferable.

The amount of the aggregating agent attached to the fabric is, for example, preferably 5 to 120 g/cm$^2$, and more preferably 20 to 60 g/cm$^2$. When the attachment amount of the aggregating agent is within the above range, the aggregating agent is likely to be present relatively uniformly on the fabric, and therefore the ink can be less likely to permeate the fabric.

Next, the pretreatment liquid applied to the fabric is dried. A drying method is not particularly limited, and may be heating with hot air, a hot plate, or a heat roller. Heat drying is preferable from a viewpoint of sufficiently removing a solvent component in a short time. A drying temperature may be 100 to 130° C.

2) Ink applying step. Next, the ink is applied onto the fabric to which the aggregating agent is attached. An ink applying method is not particularly limited, but is preferably an inkjet method.

<Ink>

The ink contains a pigment, a first resin, and water.

(Pigment)

The pigment is not particularly limited, but may be, for example, an organic pigment or an inorganic pigment of the following number described in Color Index.

Examples of an orange or yellow pigment include C. I. Pigment Orange 31, C. I. Pigment Orange 43, C. I. Pigment Yellow 12, C. I. Pigment Yellow 13, C. I. Pigment Yellow 14, C. I. Pigment Yellow 15, C. I. Pigment Yellow 17, C. I. Pigment Yellow 74, C. I. Pigment Yellow 83, C. I. Pigment Yellow 93, C. I. Pigment Yellow 94, C. I. Pigment Yellow 128, C. I. Pigment Yellow 138, C. I. Pigment Yellow 151, C. I. Pigment Yellow 154, C. I. Pigment Yellow 155, C. I. Pigment Yellow 180, C. I. Pigment Yellow 185, and C. I. Pigment Yellow 213.

Examples of a red or magenta pigment include Pigment Red 3, 5, 19, 22, 31, 38, 43, 48: 1, 48: 2, 48: 3, 48: 4, 48: 5, 49: 1, 53: 1,57: 1, 57: 2, 58: 4, 63: 1, 81, 81: 1, 81: 2, 81: 3, 81: 4, 88, 104, 108, 112, 122, 123, 144, 146, 149, 166, 168, 169, 170, 177, 178, 179, 184, 185, 208, 216, 226, and 257, Pigment Violet 3, 19, 23, 29, 30, 37, 50, and 88, and Pigment Orange 13, 16, 20, and 36.

Examples of a blue or cyan pigment include Pigment Blue 1,15,15: 1, 15: 2, 15: 3, 15: 4, 15: 6, 16, 17-1, 22, 27, 28, 29, 36, and 60.

Examples of a green pigment include Pigment Green 7, 26, 36, and 50. Examples of a yellow pigment include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193.

Examples of a black pigment include Pigment Black 7, 28, and 26.

The pigment is preferably further dispersed with a pigment dispersant from a viewpoint of improving dispersibility in the ink. The pigment dispersant will be described later.

The pigment may be a self-dispersible pigment. The self-dispersible pigment is obtained by modifying a surface of a pigment particle with a hydrophilic group, and has the pigment particle and the hydrophilic group bonded to a surface of the pigment particle. Examples of the hydrophilic group include a carboxyl group, a sulfonate group, and a phosphorus-containing group. Examples of the phosphorus-containing group include a phosphate group, a phosphonate group, a phosphinate group, a phosphite group, and a phosphate group.

Examples of a commercially available product of the self-dispersible pigment include Cab-O-Jet (registered trademark) 200K, 250C, 260M, and 270V (sulfonate group-containing self-dispersible pigment), Cab-O-Jet (registered trademark) 300K (carboxylic acid group-containing self-dispersible pigment), and Cab-O-Jet (registered trademark) 400K, 450C, 465M, 470V, and 480V (phosphate group-containing self-dispersible pigment), manufactured by Cabot Corporation.

The content of the pigment is, for example, preferably 0.3 to 10% by mass, and more preferably 0.5 to 3% by mass with respect to the ink from a viewpoint of being able to form a high-density image.

(First Resin)

The first resin is a binder resin. The first resin is preferably a water-dispersible resin (resin particle). The water-dispersible resin may be a self-dispersible resin particle (self-dispersible resin particle) into which a hydrophilic component necessary for stable dispersion in water is introduced, or may be a resin particle that becomes water-dispersible by use of an external emulsifier.

The water-dispersible resin is preferably, for example, a urethane-based, styrene-acrylic, polycarbonate-based, (meth)acrylic, or vinyl chloride-vinyl acetate-based resin from a viewpoint of not impairing the texture of the fabric, and is more preferably a urethane-based or (meth)acrylic resin from a viewpoint of flexibility.

The urethane-based resin may be any of a polyether urethane-based resin, a polyester urethane-based resin, and a polycarbonate urethane-based resin. Examples of a commercially available product of the urethane-based resin include ETERNACOLL UW-1501F and UW-5002 (trade names, manufactured by Ube Industries, Ltd.), TAKELAC WS-5000, W-6061, W-6110, WS-5984, and WS-5100 (trade names manufactured by Mitsui Chemicals, Inc.), PERMARIN UA-150 and UA-200, and UCOAT UX-390 (trade names, manufactured by Sanyo Chemical Industries, Ltd.), and HYDRAN WLS-210 (trade name, manufactured by DIC Corporation).

The (meth)acrylic resin is a polymer containing a structural unit derived from an alkyl (meth)acrylate, and is preferably a polymer containing an alkyl acrylate as a main component. This is because the polymer of an alkyl acrylate has a lower glass transition temperature (Tg) than a polymer of an alkyl methacrylate and has flexibility, and therefore hardly impairs the texture of the fabric in inkjet textile printing. Note that (meth)acryl is a concept including both methacryl and acryl.

The number of carbon atoms in an alkyl group of the alkyl acrylate is, for example, 4 to 8. Examples of such an alkyl acrylate include butyl acrylate, pentyl acrylate, hexyl acrylate, heptyl acrylate, and 2-ethylhexyl acrylate, and butyl acrylate is preferable.

The polymer containing an alkyl acrylate as a main component may further contain a structural unit derived from a monomer other than the alkyl acrylate. Examples of the other monomer include an alkyl methacrylate, a (meth)acrylamide, a functional group-containing alkyl (meth)acrylate (for example, hydroxyalkyl (meth)acrylate), a (meth)acrylate having an aromatic ring, and styrene, and an alkyl methacrylate is preferable, and a methyl methacrylate is more preferable.

The content of the structural unit derived from the alkyl acrylate is preferably 60% by mass or more, more preferably 70% by mass or more, and still more preferably 80% by mass or more with respect to all the structural units of the polymer.

These water-dispersible resins may further each have an anionic group such as a carboxyl group, a sulfo group, or a hydroxy group from a viewpoint of improving storage stability of the ink or from a viewpoint of improving reactivity with the aggregating agent contained in the pretreatment liquid.

An average particle size of the water-dispersible resin is preferably 30 to 200 nm, and more preferably 50 to 120 nm, for example, from a viewpoint of improving dischargeability by inkjet. The average particle size is an average value of primary particle sizes. The average particle size of resin particles in the resin dispersion liquid can be measured as, for example, a dispersion particle size (Z average) in a Zataizer Nano S90 manufactured by Melvern Instruments Ltd.

A glass transition temperature (Tg) of the first resin is preferably low from a viewpoint of hardly impairing the texture of the fabric, and is, for example, −25° C. or lower, and preferably −25 to −50° C. Tg of the resin can be measured by differential scanning calorimetry at a temperature rising rate of 10° C./min in accordance with HS K7121.

In addition, the first resin is preferably a relatively flexible resin from a viewpoint of preventing the texture of the fabric from being impaired even when the attachment amount of the first resin is increased. Therefore, Tg of the first resin is preferably equal to or lower than Tg of the second resin. For example, the first resin preferably contains a (meth)acrylic resin having Tg of −35° C. or lower.

The content of the first resin in the ink is preferably larger than the content of the second resin in the coating liquid. When the content of the first resin in the ink is relatively large, not only fixability of the ink to the fabric is easily sufficiently enhanced, but also the coating liquid can be less likely to permeate the fabric.

Specifically, the content of the first resin in the ink is preferably 10 to 35% by mass with respect to the ink. When the content of the first resin is 10% by mass or more, not only fixability of the ink to the fabric can be sufficiently enhanced, but also the coating liquid can be less likely to permeate the fabric. The content of the first resin is more preferably 15 to 35% by mass, and still more preferably 20 to 28% by mass with respect to the ink from a similar viewpoint.

(Other component)

The ink may further contain another component such as a water-soluble organic solvent, a pigment dispersant, a surfactant, an antiseptic, an antifungal agent, or a pH adjuster as necessary.

Examples of the water-soluble organic solvent include an alcohol (for example, methanol, ethanol, propanol, pentanol, hexanol, cyclohexanol, or benzyl alcohol), a polyhydric alcohol (for example, ethylene glycol, diethylene glycol, triethylene glycol, polyethylene glycol, propylene glycol, dipropylene glycol, tripropylene glycol, polypropylene glycol, glycerin, or a compound represented by formula (1)), a polyhydric alcohol ether (for example, ethylene glycol monomethyl ether, ethylene glycol monoethyl ether, ethylene glycol monobutyl ether, ethylene glycol monophenyl ether, diethylene glycol monomethyl ether, diethylene glycol monoethyl ether, diethylene glycol monobutyl ether, diethylene glycol dimethyl ether, propylene glycol monomethyl ether, or propylene glycol monoethyl ether), an amine (for example, ethanolamine, N-ethyldiethanolamine, morpholine, N-ethylmorpholine, ethylenediamine, diethylenediamine, or triethylenetetramine), an amide (for example, formamide, N,N-dimethylformamide, or N,N-dimethylacetamide), a heterocycle (for example, 2-pyrrolidone, N-methyl-2 pyrrolidone, N-cyclohexyl-2-pyrrolidone, 2-oxazolidone, or 1,3-dimethyl-2-imidazolidine), a sulfoxide (for example, dimethylsulfoxide), and a sulfone (for example, sulfolane).

[Chemical formula 1]

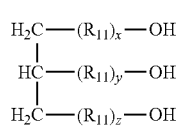

Formula (1)

(In formula (1), each of Riis represents an ethylene glycol group or a propylene glycol group, x, y, and z are all positive integers, and x+y+z=3 to 30.)

In particular, the ink is preferably less likely to be thickened by drying from a viewpoint of making it easy for the ink to permeate the fabric and from a viewpoint of enhancing dischargeability from an inkjet recording head. Therefore, the ink preferably contains a high-boiling point solvent having a boiling point of 200° C. or higher.

Examples of the high-boiling point solvent having a boiling point of 200° C. or higher include a polyol and a polyalkylene oxide each having a boiling point of 200° C. or higher. A polyol having a boiling point of 200° C. or higher is preferable, and glycerin is more preferable.

The content of the water-soluble organic solvent is not particularly limited, but is preferably 10 to 40% by mass, and more preferably 20 to 35% by mass with respect to the ink from a viewpoint of, for example, dischargeability by an inkjet recording head. The total content of water and the water-soluble organic solvent is not particularly limited, but is, for example, preferably 50 to 90% by mass, and more preferably 60 to 85% by mass with respect to the ink.

The pigment dispersant is present in the ink so as to surround a surface of the pigment particle, or is adsorbed on the surface of the pigment particle to form a pigment dispersion, thereby dispersing the pigment favorably. The pigment dispersant is preferably a polymer dispersant, and more preferably an anionic polymer dispersant. The anionic polymer dispersant is a polymer dispersant having a hydrophilic group such as a carboxylic acid group, a phosphorus-containing group, or a sulfonate group, and is preferably a polymer dispersant having a carboxylic acid group.

The polymer dispersant having a carboxylic acid group may be a polycarboxylic acid or a salt thereof. Examples of the polycarboxylic acid include a (co)polymer of a monomer selected from the group consisting of acrylic acid or a derivative thereof, maleic acid or a derivative thereof, itaconic acid or a derivative thereof, and fumaric acid or a derivative thereof, and a salt thereof. Examples of the other monomer constituting the copolymer include styrene and vinylnaphthalene.

The anionic group equivalent of the anionic polymer dispersant may be, for example, 1.1 to 3.8 meq/g from a viewpoint of sufficiently dispersing the pigment particles. When the anionic group equivalent is within the above range, high pigment dispersibility is easily obtained without increasing the molecular weight of the anionic polymer dispersant. The anionic group equivalent can be determined from an acid value, and the acid value can be measured in accordance with JIS K0070.

The weight average molecular weight (Mw) of the polymer dispersant may be, for example, 5000 to 30000. When Mw of the polymer dispersant is 5000 or more, the pigment particles are easily sufficiently dispersed. When Mw of the polymer dispersant is 30000 or less, the ink is not excessively thickened. Mw of the polymer dispersant can be measured by a method similar to that described above.

The content of the polymer dispersant is, for example, 20 to 100% by mass, and preferably 25 to 60% by mass with respect to the pigment in order to sufficiently disperse the pigment particles.

The surfactant may reduce surface tension of the ink to increase wettability to the fabric. The type of surfactant is not particularly limited, but may be, for example, an acetylene glycol-based surfactant, a silicone-based surfactant, or a fluorine-based surfactant.

Examples of the antiseptic or the antifungal agent include an aromatic halogen compound (for example, Preventol CMK), methylene dithiocyanate, a halogen-containing nitrogen sulfur compound, and 1,2-benzisothiazolin-3-one (for example, PROXEL GXL).

Examples of the pH adjuster include citric acid, sodium citrate, hydrochloric acid, and sodium hydroxide.

The viscosity of the ink at 25° C. is not particularly limited as long as an ejection property by an inkjet method is favorable, but is preferably 3 to 20 mPa·s, and more preferably 4 to 12 mPa·s. The viscosity of the ink can be measured by an E-type viscometer at 25° C.

The surface tension of the ink at 25° C. is not particularly limited, but is preferably larger than the surface tension of the coating liquid at 25° C. from a viewpoint of sufficiently wet-spreading the ink on the fabric. Specifically, the surface tension of the ink at 25° C. is preferably 35 to 45 mN/m. The surface tension of the ink can be measured at 25° C. by a Wilhelmy method in accordance with HS K2241 using a surface tensiometer.

The amount of the first resin attached to the fabric is preferably 1.5 g/m$^2$ or more. When the attachment amount of the first resin is within the above range, not only fixability of the ink to the fabric can be sufficiently enhanced, but also the coating liquid can be less likely to permeate the fabric. The attachment amount of the first resin is more preferably 2.5 g/m$^2$ or more, and particularly preferably 2.5 to 6 g/m$^2$ from a similar viewpoint. The attachment amount of the first resin can be adjusted by the content of the first resin in the ink and the attachment amount of the ink.

Between the present step and the coating liquid applying step, a step of drying and fixing the ink applied to the fabric by heating (drying/fixing step) may be further performed. This enhances water repellency of a surface of the ink layer. Therefore, permeation of a coating liquid into the fabric when the coating liquid is applied can be further suppressed.

3) Coating Liquid Applying Step

Next, a coating liquid is applied onto the ink layer of the fabric.

<Coating Liquid>

The coating liquid contains a second resin and water.

(Second Resin)

The second resin is a binder resin of the coating liquid, and is preferably a water-dispersible resin (resin particle). The second resin contains a resin that is aggregated by an aggregating agent, preferably a water-dispersible resin having a group that reacts with the aggregating agent. For example, in a case where the aggregating agent is a polyvalent metal compound (compound having a cationic group), the second resin preferably contains a water-dispersible resin having an anionic group. The anionic group refers to a carboxyl group, a sulfo group (sulfonate group), a hydroxy group, or the like.

As the water-dispersible resin having an anionic group, a resin similar to the water-dispersible resin as the first resin can be used except for having an anionic group. That is, the second resin preferably contains a urethane-based, styrene-acrylic, polycarbonate-based, (meth)acrylic, or vinyl chloride-vinyl acetate-based resin having an anionic group, and more preferably contains a urethane-based resin having an anionic group from a viewpoint of flexibility and feeling on the skin.

The anionic group equivalent of the water-dispersible resin having an anionic group is not particularly limited, but may be similar to the range of the anionic group equivalent of the pigment dispersant contained in the ink. The anionic group equivalent can be measured by a method similar to that described above.

The ranges of Tg and the average particle size of the second resin can be similar to the ranges of Tg and the average particle size of the first resin. In particular, Tg of the second resin may be equal to or higher than Tg of the first resin, and for example, Tg of the second resin may be higher than −25° C., and a difference in Tg between the second resin and the first resin may be, for example, 10° C. or more.

(Other Component)

The coating liquid may further contain another component such as a water-soluble organic solvent, a surfactant, an antiseptic, an antifungal agent, or a pH adjuster as necessary. As the water-soluble organic solvent, the surfactant, the antiseptic, the antifungal agent, and the pH adjuster, agents similar to those described above can be used.

<Application of Coating Liquid>

A method for applying the coating liquid is not particularly limited, and may be any of a spray method, a mangle method (pad method), a coating method, and an inkjet method similarly to the method for applying the pretreatment liquid. For example, in a case where the ink applying step and the method for applying the coating liquid are performed online, an inkjet method is preferable.

As described above, in the present invention, 1) the content of the second resin in the coating liquid is smaller than the content of the first resin in the ink. By reducing the content of the second resin in the coating liquid, a reaction rate between the second resin and the aggregating agent on the ink layer can be appropriately reduced. As a result, the coating liquid is less likely to be excessively thickened on the ink layer, and therefore the coating liquid is easily wet-spread on the ink layer. Specifically, the content of the second resin in the coating liquid is preferably 0.5 times or less, and more preferably 0.1 to 0.3 times the content of the first resin in the ink.

The content of the second resin in the coating liquid is preferably 1 to 15% by mass with respect to the coating liquid. When the content of the second resin is 1% by mass or more, the entire surface of the ink layer is easily covered with the second resin, and therefore friction fastness is easily sufficiently enhanced. When the content of the second resin is 15% by mass or less, an aggregation rate of the second resin by the aggregating agent is further reduced, and therefore the coating liquid is more easily wet-spread on the ink layer. The content of the second resin is more preferably 3 to 8% by mass with respect to the coating liquid from a similar viewpoint.

In addition, the content of the second resin in the coating liquid or the amount of the second resin attached to the fabric may be adjusted according to the amount of the aggregating agent attached to the fabric. That is, the second resin contained in the coating liquid reacts with the aggregating agent on the fabric or the ink layer to be aggregated, and easily thickens the coating liquid. Therefore, in a case where the amount of the aggregating agent attached to the fabric is large, it is preferable to reduce the content of the second resin in the coating liquid, and it is preferable to increase the amount of the second resin attached to the fabric.

In addition, as described above, 2) the amount of the coating liquid attached to the fabric is larger than the amount of the ink attached to the fabric. When the attachment amount of the coating liquid is large, the entire surface of the ink layer is easily covered with the coating liquid, and therefore sufficient friction fastness is easily obtained. Specifically, the amount of the coating liquid attached to the fabric is preferably 1.4 times or more, and more preferably 1.5 to 2 times the amount of the ink attached to the fabric.

Specifically, the amount of the coating liquid attached to the fabric is preferably 10 to 100 $g/m^2$. When the amount of the coating liquid attached to the fabric is within the above range, not only friction fastness is easily improved, but also the texture of the fabric is hardly impaired. The amount of the coating liquid attached to the fabric is more preferably 20 to 50 $g/m^2$ from a similar viewpoint.

The amount of the coating liquid attached to the fabric can be adjusted by a method similar to that described above. For example, in a case where the coating liquid is applied by an inkjet method, the amount of the coating liquid attached to the fabric can be adjusted by the amount of the coating liquid per droplet (droplet amount), the number of discharged droplets, a discharge waveform, a discharge voltage, and the like. For example, in a case where the ink applying step and the coating liquid applying step are each performed by an inkjet method, the amount of droplets of the coating liquid is preferably larger than the amount of droplets of the ink.

The attachment amount of the second resin is, for example, preferably smaller than the attachment amount of the first resin, and is, for example, preferably 0.1 to 3 $g/m^2$ and more preferably 0.3 to 1.0 $g/m^2$. When the attachment amount of the second resin is equal to or more than the lower limit value, friction fastness is more easily enhanced, and when the attachment amount of the second resin is equal to or less than the upper limit value, the texture of the fabric is more hardly impaired.

The surface tension of the coating liquid at 25° C. is not particularly limited, but is preferably smaller than the surface tension of the ink at 25° C. from a viewpoint of sufficiently wet-spreading the coating liquid on the ink layer. Specifically, the surface tension of the coating liquid at 25° C. is preferably 30 to 40 mN/m. The surface tension of the coating liquid can be adjusted by, for example, the content of the second resin, a solvent composition, presence or absence of a surfactant, and the like.

Note that, in the above embodiment, since wet-spreadability of the coating liquid also varies depending on the attachment amount of the ink, the attachment amount of the coating liquid may be adjusted according to the attachment amount of the ink. In a case where the attachment amount of the ink is large, the attachment amount of the coating liquid is preferably also large, for example, from a viewpoint of emphasizing friction fastness.

In addition, since wettability of the ink and the coating liquid on the fabric varies depending on the temperature and humidity of an atmosphere, the attachment amount of the ink and the attachment amount of the coating liquid may be adjusted according to the temperature and humidity of an atmosphere. For example, in a case where the humidity of an atmosphere is high, wettability of the ink and the coating liquid on the fabric is high, and therefore it is preferable to reduce the attachment amount of the ink.

In addition, since wettability of the ink and the coating liquid on the fabric varies depending on the water content in the fabric, the attachment amount of the ink and the attachment amount of the coating liquid may be adjusted according to the water content in the fabric. For example, in a case where the water content in the fabric is large, wettability of the ink and the coating liquid on the fabric is high, and therefore it is preferable to reduce the attachment amounts of the ink and the coating liquid.

In addition, the degree of deterioration of the texture of the fabric due to application of the coating liquid also varies depending on the thickness of the fabric and the thickness of the fiber. Therefore, the attachment amount of the coating liquid may be adjusted according to the thickness of the fabric and the thickness of the fiber. For example, in a case where the thickness of the fabric is thick or in a case where the thickness of the fiber is thick, the attachment amount of the coating liquid may be increased.

An image-formed product obtained by the image forming method according to an embodiment of the present invention includes the fabric to which the aggregating agent is attached, the ink layer containing the pigment and the first resin, and the coating layer containing the second resin in this order.

In the present invention, 95% by volume or more of the second resin derived from the coating liquid is preferably distributed closer to the ink layer side than a central portion of the fabric in the thickness direction. A distribution state of the second resin can be confirmed by cutting the image-formed product along the thickness direction and observing the obtained cut surface with an optical microscope.

As described above, the distribution state of the second resin can be adjusted by the pretreatment of the fabric, the attachment amount of the aggregating agent, the attachment amount and type of the first resin (derived from the ink), and the like. For example, when the attachment amount of the aggregating agent is increased or the attachment amount of the first resin is increased, the second resin is more easily distributed on the ink layer side than the central portion of the fabric in the thickness direction.

2. Image Forming Apparatus

Figure 1B:
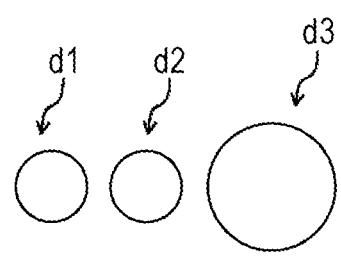

FIG. 1A is a schematic diagram illustrating an outline of an image forming apparatus according to an embodiment of the present invention, and FIG. 1B is an image diagram of dots at the time of printing by the image forming apparatus of FIG. 1A.

An image forming apparatus 100 includes a head carriage 110 having a plurality of inkjet recording heads that discharges ink droplets onto a fabric 130 mounted thereon, and a drying unit 120. In FIG. 1A, the head carriage 110 and the drying unit 120 are disposed in this order from an upstream side along a conveyance direction (arrow X direction in the drawing) of the fabric 130.

The head carriage 110 includes, for example, an inkjet recording head 111 that discharges a pretreatment liquid, an inkjet recording head 112 that discharges an ink, and an inkjet recording head 113 that discharges a coating liquid. Note that, although only one inkjet recording head 112 that discharges an ink is illustrated in FIG. 1A for convenience, four inkjet recording heads 112 may be mounted for every four colors, and yellow, magenta, cyan, and black inks may be discharged from nozzles (not illustrated) of the respective inkjet recording heads 112.

The droplet amounts of the pretreatment liquid discharged from the inkjet recording head 111, the ink discharged from the inkjet recording head 112, and the coating liquid discharged from the inkjet recording head 113 are each preferably 10 to 50 pL. For example, the droplet amount (d3) of the coating liquid is preferably larger than the droplet amount (d1) of the pretreatment liquid and the droplet amount (d2) of the ink, and particularly larger than the droplet amount (d2) of the ink (see FIG. 1B). Specifically, the droplet amounts of the pretreatment liquid and the ink may be each more preferably 20 to 30 pL, and the droplet amount of the coating liquid may be more preferably 30 to 50 pL. This is in order to increase a coverage of a surface of the ink layer by the coating liquid. The droplet amount and the attachment amount of each liquid are adjusted by control of the inkjet recording heads 111, 112, and 113 by a control unit (not illustrated).

The drying unit 120 may be a known dryer such as a hot air dryer that blows hot air or an irradiator that emits infrared rays or ionizing radiation.

In the image forming apparatus 100, the fabric 130 is conveyed below the head carriage 110. Next, droplets of the pretreatment liquid are discharged from the inkjet recording head 111 mounted on the head carriage 110 to apply the pretreatment liquid to the fabric 130. Next, ink droplets are discharged from the inkjet recording head 112 to apply the ink. Next, droplets of the coating liquid are discharged from the inkjet recording head 113 to apply the coating liquid. Thereafter, the image formed on the fabric 130 is dried by, for example, blowing temperature-controlled air onto the image from the drying unit 120.

Note that, in the image forming apparatus 100 according to the above embodiment, an example in which the pretreatment liquid, the ink, and the coating liquid are applied and then collectively dried has been described. However, a drying step may be performed between the pretreatment liquid applying step and the ink applying step, and between the ink applying step and the coating liquid applying step.

In addition, in the above embodiment, the pretreatment liquid applying step, the ink applying step, and the coating liquid applying step are continuously performed online. However, the pretreatment liquid applying step and the coating liquid applying step may be performed offline. In this case, the pretreatment liquid applying step and the coating liquid applying step may be performed by a method different from the inkjet method, for example, by a dipping method or a mangle method.

In addition, the image forming apparatus 100 according to the above embodiment may adjust the attachment amount of the coating liquid according to the attachment amount of the ink. For example, the image forming apparatus 100 may include an image acquisition unit (not illustrated) for acquiring the attachment amount of the ink, and the control unit may adjust the attachment amount of the coating liquid based on acquired data of the attachment amount of the ink.

In addition, the image forming apparatus 100 according to the above embodiment may adjust the attachment amounts of the ink and the coating liquid according to the temperature and humidity of an atmosphere and the water content in the fabric. For example, the image forming apparatus 100 may include a sensor (not illustrated) that acquires the temperature and humidity of an atmosphere, the water content in the fabric, and the like, and the control unit may adjust the attachment amounts of the ink and the coating liquid based on acquired data of the temperature and humidity of the atmosphere and the water content in the fabric.

EXAMPLES

Hereinafter, the present invention will be described in with reference to Examples. The scope of the present invention is not construed as being limited by Examples.

1. Preparation of Pretreatment Liquid, Ink, and Coating Liquid 1-1. Preparation of Pretreatment Liquid <Preparation of Pretreatment Liquid 1>

5% by mass of EPOMIN P-1000 (registered trademark) (polyethyleneimine) manufactured by NIPPON SHOKUBAI CO., LTD., as an aggregating agent, 40% by mass of ethylene glycol as a solvent, and deionized water as the balance were mixed such that the total amount thereof was 100% by mass to prepare a pretreatment liquid (content of aggregating agent: 5% by mass).

<Preparation of Pretreatment Liquid 2>

A pretreatment liquid 2 (content of aggregating agent: 5% by mass) was prepared in a similar manner to the pretreatment liquid 1 except that lactic acid was used as the aggregating agent.

1-2. Preparation of Ink

<Preparation of Ink 1>

(Preparation of Pigment Dispersion Liquid)

CAB-O-JET (registered trademark) 465M (pigment dispersion liquid) manufactured by Cabot Corporation was added as a magenta pigment, and the resulting mixture was premixed. Thereafter, the magenta pigment was dispersed therein using a sand grinder filled with 0.5 mm zirconia beads at 50% by volume to obtain a magenta pigment dispersion having a pigment concentration of 3% by mass.

(Preparation of First Resin Dispersion Liquid)

Into a separable flask equipped with a stirrer, a temperature sensor, a cooling tube, and a nitrogen introduction device, an activator solution in which 2.52 g of an anionic activator (sodium dodecylbenzene sulfonate: SDS) and 0.58 g of sodium carbonate were dissolved in 553 g of deionized water in advance was put, and an internal temperature thereof was raised to 80° C. while the activator solution was stirred at a stirring rate of 330 rpm under a nitrogen stream.

Meanwhile, 160 g of n-butyl acrylate (BA) and 27.5 g of methyl methacrylate (MMA) were dissolved in the activator solution to prepare a monomer solution.

Next, a solution in which 0.07 g of a polymerization initiator (potassium persulfate: KPS) was dissolved in 2.66 g of deionized water was prepared and heated at 80° C. The monomer solution prepared above was added dropwise to this solution over 60 minutes, and the resulting mixture was stirred. After completion of the dropwise addition, the mixture was further heated and stirred for 120 minutes, and then cooled to 40° C. to obtain an aqueous dispersion liquid (first resin dispersion liquid) of an acrylic resin 1 (BA/ MMA=90/10 mass ratio, Tg: −30° C., average particle size: 80 nm).

(Preparation of Ink)

Next, the following components were mixed to make the total amount 100 parts by mass, thereby obtaining an ink 1:
Pigment dispersion liquid prepared above: 8.7 parts by mass (solid content: 23 parts by mass)
First resin dispersion liquid prepared above: 60 parts by mass (solid content: 30 parts by mass)
Propylene glycol: 20 parts by mass
Glycerin: 10 parts by mass
Deionized water: balance <Preparation of Inks 2 and 4>

Inks 2 and 4 were prepared in a similar manner to the ink 1 except that the blending amount of the first resin dispersion liquid was changed such that the contents of the first resin were values presented in Table 1.

<Preparation of Ink 3>

An ink 3 was prepared in a similar manner to the ink 1 except that the aqueous dispersion liquid of the acrylic resin 1 was changed to an aqueous dispersion liquid of urethane resin (TAKELAC W6061 manufactured by Mitsui Chemicals, Inc., Tg: −20° C.), and the content of the urethane resin was a value presented in Table 1.

Surface tension of each of the inks 1 to 4 was measured by the following method.

<Measurement of Surface Tension>

Surface tension of each of the obtained inks was measured at 25° C. in accordance with JIS K2241 using a Wilhelmy surface tensiometer manufactured by Kyowa Interface Science Co., Ltd.

TABLE 1

| Ink No. | First resin | | |
|---|---|---|---|
| | Type | Content (% by mass) | Surface tension (mN/m) |
| 1 | Acrylic resin 1 | 10 | 44 |
| 2 | Acrylic resin 1 | 20 | 40 |
| 3 | Urethane resin | 10 | 30 |
| 4 | Acrylic resin 1 | 15 | 42 |

1-3. Preparation of Coating Liquid

<Preparation of Coating Liquid 1>

Aqueous dispersion liquid of urethane resin (second resin dispersion liquid, TAKELAC W6061 manufactured by Mitsui Chemicals, Inc., Tg: −20° C.): solid content corresponding to 0.5 parts by mass
Propylene glycol: 20 parts by mass
Glycerin: 10 parts by mass
Deionized water: balance <Preparation of Coating Liquids 2 to 5>

Coating liquids 2 to 5 were prepared in a similar manner to the coating liquid 1 except that the blending amount of the second resin dispersion liquid was changed such that the content of the second resin was each of values presented in Table 2.

Surface tension of each of the coating liquids 1 to 5 was measured in a manner similar to the above.

TABLE 2

| Coating liquid No. | Second resin | | |
|---|---|---|---|
| | Type | Content (% by mass) | Surface tension (mN/m) |
| 1 | Urethane resin | 0.5 | 42 |
| 2 | | 2 | 37 |
| 3 | | 5 | 32 |
| 4 | | 10 | 30 |
| 5 | | 15 | 28 |

2. Image Formation and Evaluation

<Tests 1 to 23>

(1) Pretreatment

As a fabric, cotton broad 40 (cotton 100%) was used.

Next, as an image forming apparatus, an inkjet printer including an inkjet recording head A for a pretreatment liquid, an inkjet recording head B for an ink, and an inkjet recording head C for a coating liquid (each of these is a Konica Minolta head KM1024iMAE) was prepared. Then, a pretreatment liquid presented in Table 3 was discharged from a nozzle of the inkjet recording head A to form a solid image on the fabric.

Specifically, an image including a thin line grid, gradation, and a solid portion was formed at 720 dpi in main scanning×720 dpi in sub scanning. The dpi represents the number of ink droplets (dots) per 2.54 cm. A discharge frequency was 22.4 kHz, and a droplet amount (d1) of the pretreatment liquid was 25 pL. Thereafter, the fabric to which the pretreatment liquid had been applied was dried at 150° C. with a dryer.

(2) Application of Ink

Next, an ink presented in Table 3 was discharged from a nozzle of the inkjet recording head B of the image forming apparatus to form a solid image (ink layer) on the pretreated fabric.

Ink application conditions were similar to those described above except that an ink droplet amount (d2) was 45 pL and an ink attachment amount was a value presented in Table 3. Thereafter, the fabric to which the ink had been applied was dried at 150° C. for three minutes with a dryer.

(3) Application of Coating Liquid

Next, a coating liquid presented in Table 3 was discharged from a nozzle of the inkjet recording head C of the image forming apparatus to form a solid image (coating layer) on the ink layer of the fabric.

Ink application conditions were similar to those described above except that a coating liquid droplet amount (d3) was 25 pL and a coating liquid attachment amount was a value presented in Table 3. Then, the solid image was dried at 150° C. for three minutes with a dryer to obtain an image-formed product.

<Evaluation>

Wet-spreading of each of the coating liquids used in tests 1 to 23, and friction fastness and a texture of each of the obtained image-formed products were evaluated by the following methods.

(1) Wet-Spreading

As for the extent of wet-spreading of a coating liquid, the degree of coverage with the coating liquid in a dry state in a case of inkjet application at a resolution of 720×720 dpi was observed with an optical microscope. Note that, for evaluation of wet-spreading, a colored coating liquid to which a small amount of a cyan pigment dispersion liquid had been added was used for easy observation. Evaluation was performed according to the following criteria.

○: There is no gap between dots, and the entire ink dot is completely covered.

Δ: Gaps are observed in some places between dots.

×: There is a gap between dots.

A sample evaluated as Δ or higher was determined as a favorable one.

(2) Friction Fastness (Dry Friction Fastness)

Dry friction fastness of each of the obtained image-formed products was evaluated by a clock meter (friction tester) in accordance with ISO 105 X-19: 2020 (JIS L 0849). A rank was determined using a gray scale for contamination based on JI50805 as an evaluation fabric, and evaluation was performed based on the following indices.

A sample having a rank of 2 to 3 was determined as an acceptable one.

(3) Texture

The obtained image-formed products and the texture of the fabric were touched with a finger, and sensory evaluation was performed thereon. The evaluation was performed based on the following criteria:

⊙: The original softness of the fabric is maintained at a high level;

○: The original softness of the fabric is maintained;

Δ: The original softness of the fabric is lost, and the fabric is slightly hard, but there is no problem in practical use;

×: The fabric is harder than the original fabric, and the texture of the fabric is impaired;

A sample evaluated as Δ or higher was determined as a favorable one.

Evaluation results of tests 1 to 23 are presented in Table 3 set forth below:

| | | Pretreatment liquid | | | Ink | | | | First | |
| | | Aggregating agent | | | First resin | | | Ink | resin | |
| Test | No. | Type | Attachment amount (g/cm$^2$) | No. | Type | Content (% by mass) | Surface tension (mN/m) | attachment amount (g/m$^2$) | attachment amount (g/m$^2$) | Coating liquid No. |
|---|---|---|---|---|---|---|---|---|---|---|
| 1 | 1 | Polyethyleneimine | 25 | 1 | Acrylic resin 1 | 10 | 44 | 15 | 1.5 | 1 |
| 2 | | (cationic polymer) | | | | | | | | 2 |
| 3 | | | | | | | | | | 3 |
| 4 | | | | | | | | | | 4 |
| 5 | | | | | | | | | | 5 |
| 6 | | | | 2 | Acrylic resin 1 | 20 | 40 | 15 | 3 | 1 |
| 7 | | | | | | | | | | 2 |
| 8 | | | | | | | | | | 3 |
| 9 | | | | | | | | | | 4 |
| 10 | | | | | | | | | | 5 |
| 11 | | | | 1 | Acrylic resin 1 | 10 | 44 | 15 | 1.5 | 3 |
| 12 | | | | | | | | | | |
| 13 | | | | | | | | | | |
| 14 | | | | | | | | | | |
| 15 | | | | | | | | | | |
| 16 | | | | 3 | Urethane resin | 10 | 30 | 15 | 1.5 | 3 |
| 17 | | | | 4 | Acrylic resin 1 | 15 | 42 | 15 | 2.25 | 3 |
| 18 | 1 | Polyethyleneimine | 35 | 1 | Acrylic resin 1 | 10 | 44 | 15 | 1.5 | 3 |
| 19 | | (cationic polymer) | | | | | | | | |
| 20 | | None | | 1 | Acrylic resin 1 | 10 | 44 | 15 | 1.5 | 3 |
| 21 | 2 | Lactic acid | 25 | 1 | Acrylic resin 1 | 10 | 44 | 15 | 1.5 | 3 |
| 22 | | | | | | | | | | 5 |
| 23 | | | | | | | | | | 3 |

| | Coating liquid | | | Coating liquid | Second resin | | | | |
| | Second resin | | | | | | | | |
| Test | Type | Content (% by mass) | Surface tension (mN/m) | attachment amount (g/m$^2$) | attachment amount (g/m$^2$) | Wet-spreading | Friction fastness | Texture | Note |
|---|---|---|---|---|---|---|---|---|---|
| 1 | Urethane resin | 0.5 | 42 | 30 | 0.15 | ○ | 3 | ○ | Example |
| 2 | | 2 | 37 | | 0.6 | ○ | 3 to 4 | ○ | Example |
| 3 | | 5 | 32 | | 1.5 | ○ | 4 | ○ | Example |
| 4 | | 10 | 30 | | 3 | Δ | 3 to 4 | × | Comparative Example |
| 5 | | 15 | 28 | | 4.5 | Δ | 3 | × | Comparative Example |
| 6 | Urethane resin | 0.5 | 42 | 30 | 0.15 | ○ | 3 | ⊙ | Example |
| 7 | | 2 | 37 | | 0.6 | ○ | 3 | ⊙ | Example |
| 8 | | 5 | 32 | | 1.5 | ○ | 4 | ⊙ | Example |
| 9 | | 10 | 30 | | 3 | Δ | 4 | ⊙ | Example |
| 10 | | 15 | 28 | | 4.5 | Δ | 3 to 4 | Δ | Example |
| 11 | Urethane resin | 5 | 32 | 10 | 0.5 | × | 2 | ○ | Comparative Example |

-continued

| | | | | | | | | | |
|---|---|---|---|---|---|---|---|---|---|
| 12 | | | | 15 | 0.75 | Δ | 2 | ○ | Comparative Example |
| 13 | | | | 20 | 1 | ○ | 3 | ○ | Example |
| 14 | | | | 25 | 1.25 | ○ | 4 | ○ | Example |
| 15 | | | | 30 | 1.5 | ○ | 4 | ○ | Example |
| 16 | Urethane resin | 5 | 32 | 30 | 1.5 | ○ | 2 to 3 | Δ | Example |
| 17 | Urethane resin | 5 | 32 | 30 | 1.5 | ○ | 4 | Δ | Example |
| 18 | Urethane resin | 5 | 32 | 30 | 1.5 | Δ | 3 to 4 | ○ | Example |
| 19 | resin | | | 40 | 2 | ○ | 4 | ○ | Example |
| 20 | Urethane resin | 5 | 32 | 30 | 1.5 | ○ | 4 | X | Comparative Example |
| 21 | Urethane resin | 5 | 32 | 30 | 1.5 | ○ | 4 | ○ | Example |
| 22 | Urethane resin | 15 | 28 | 30 | 4.5 | Δ | 3 | X | Comparative Example |
| 23 | Urethane resin | 5 | 32 | 10 | 0.5 | X | 2 | ○ | Comparative Example |

As presented in Table 3, it can be seen that the image-formed products (Examples) of tests 1 to 3, 6 to 10, 13 to 15, 16 to 19, and 21 all have favorable wet-spreading of the coating liquid, and exhibit favorable friction fastness and texture.

In particular, it can be seen that the texture is improved by appropriately increasing the attachment amount of the first resin (comparison between tests 8 and 17). This is presumed to be because the ink-derived first resin has higher flexibility than the second resin derived from the coating liquid, and thus an effect of suppressing deterioration of the texture due to permeation of the coating liquid into the fabric is larger than deterioration of the texture due to an increase in the attachment amount of the first resin.

On the other hand, it can be seen that in tests 4 and 5 in which the content of the second resin in the coating liquid is equal to or larger than the content of the first resin in the ink, the texture is inferior. In addition, it can be seen that in tests 11 and 12 in which the attachment amount of the coating liquid is equal to or smaller than the attachment amount of the ink, the friction fastness is inferior. In addition, it can be seen that in test 20 using a fabric not treated with an aggregating agent, although the ink and the coating liquid are relatively wet-spread, the ink and the coating liquid easily permeate the fabric, and therefore the fabric becomes hard and the texture is impaired. Note that since the ink was not aggregated and permeated the fabric, the pigment hardly remained on a surface of the fabric. It can be seen that the friction fastness itself has no problem.

According to an embodiment of the present invention, it is possible to provide an image forming method capable of forming an image having favorable friction fastness without impairing a texture of a fabric.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming method comprising:
    preparing a fabric to which an aggregating agent is attached, wherein the aggregating agent contains one or more selected from the group consisting of a polyvalent metal salt, an organic acid, and a cationic polymer;
    applying an aqueous ink containing a pigment, a first resin, and water onto the fabric to which the aggregating agent is attached; and
    applying a coating liquid containing a second resin and water onto the applied aqueous ink, wherein
        the second resin is aggregated by the aggregating agent,
        a content of the second resin in the coating liquid is smaller than a content of the first resin in the aqueous ink,
        the aqueous ink and the coating liquid are applied by an inkjet method,
        an amount of droplets of the coating liquid is larger than an amount of droplets of the aqueous ink, and
        an amount of the coating liquid attached to the fabric is larger than an amount of the aqueous ink attached to the fabric.

2. The image forming method according to claim 1, wherein
    the second resin contains a water-dispersible resin having an anionic group.

3. The image forming method according to claim 1, wherein
    the content of the second resin in the coating liquid is 0.5 times or less the content of the first resin in the aqueous ink.

4. The image forming method according to claim 1, wherein
    the content of the second resin in the coating liquid is 1 to 15% by mass with respect to the coating liquid.

5. The image forming method according to claim 1, wherein
    the content of the first resin in the aqueous ink is 10 to 35% by mass with respect to the aqueous ink.

6. The image forming method according to claim 1, wherein
    the amount of the coating liquid attached to the fabric is 1.4 times or more the amount of the aqueous ink attached to the fabric.

7. The image forming method according to claim 1, wherein
    the amount of the coating liquid attached to the fabric is 10 to 100 g/m$^2$.

8. The image forming method according to claim 1, wherein
    an amount of the first resin attached to the fabric is 2.5 g/m$^2$ or more.

9. The image forming method according to claim 1, wherein
   a glass transition temperature Tg of the first resin is lower than a glass transition temperature Tg of the second resin.

10. The image forming method according to claim 1, wherein
    the first resin contains a (meth)acrylic resin having a glass transition temperature Tg of −25° C. or lower.

11. The image forming method according to claim 1, wherein
    the second resin contains a urethane-based resin.

12. The image forming method according to claim 1, wherein
    surface tension of the coating liquid at 25° C. is smaller than surface tension of the aqueous ink at 25° C.

13. The image forming method according to claim 1, wherein
    the amount of the coating liquid attached to the fabric is adjusted according to an amount of the aggregating agent attached to the fabric.

* * * * *